UNITED STATES PATENT OFFICE.

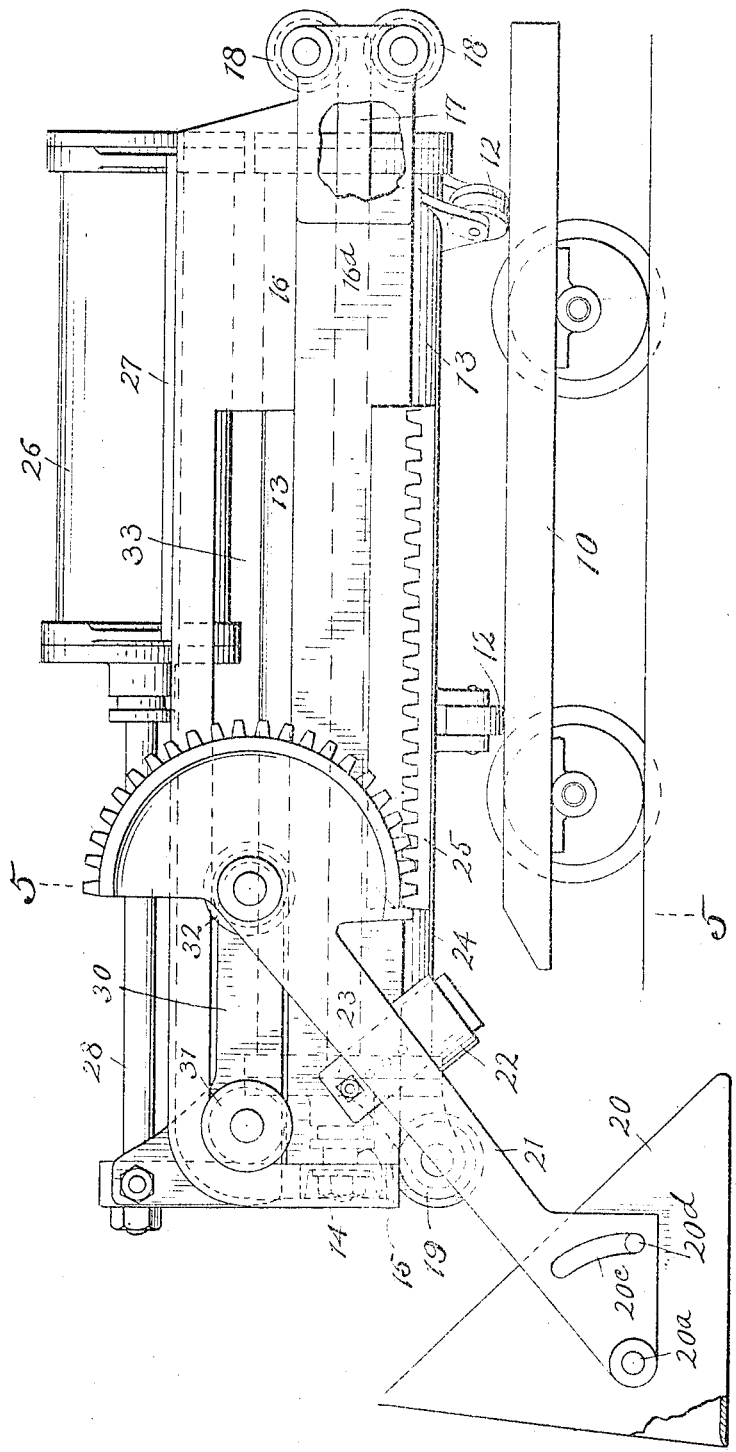

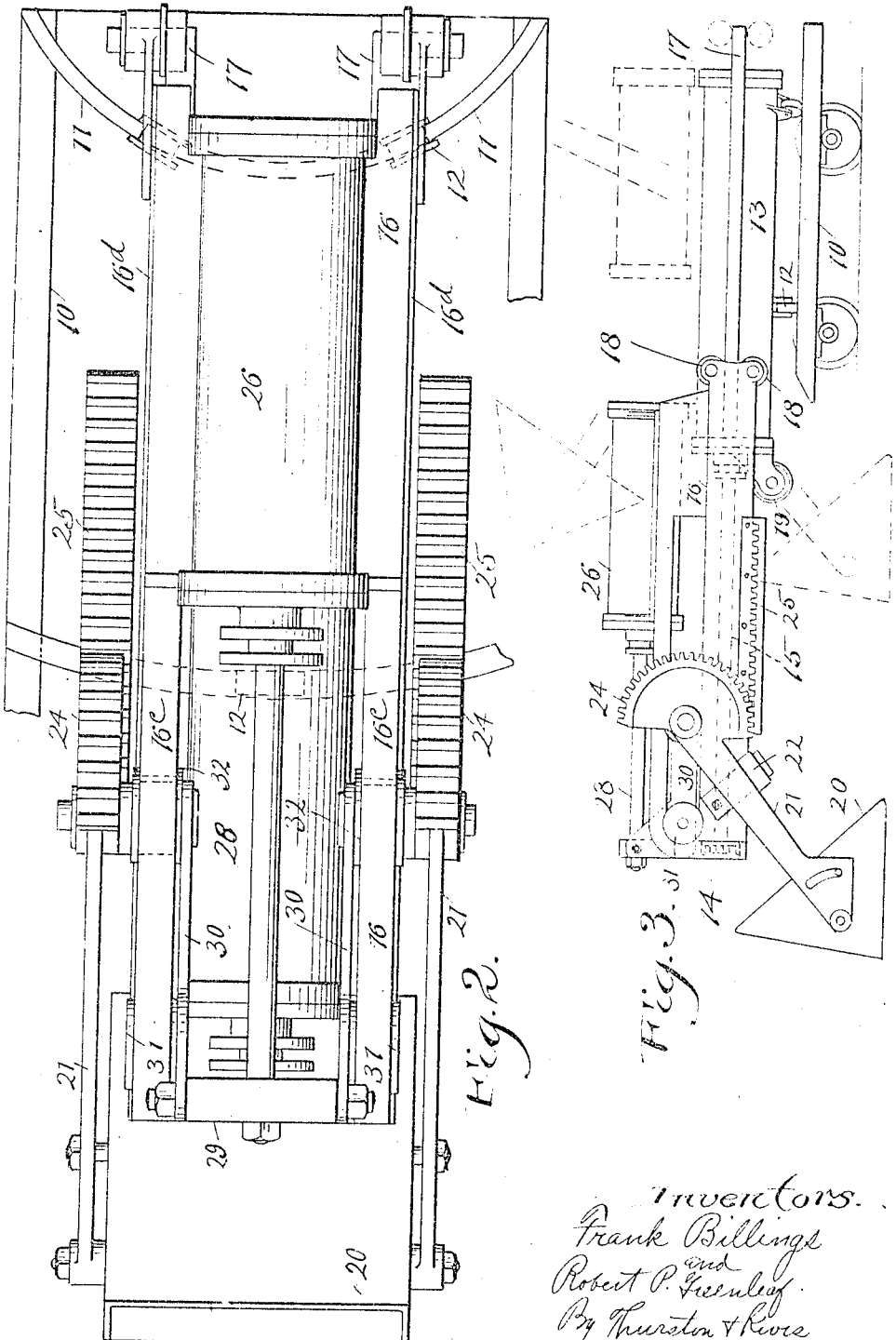

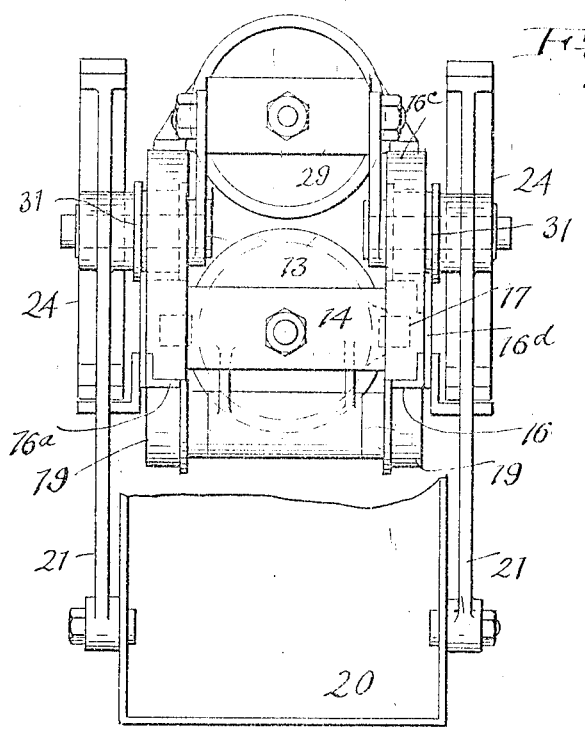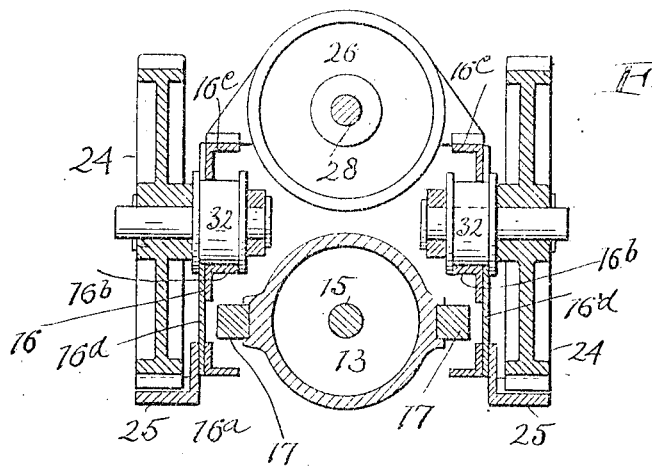

FRANK BILLINGS AND ROBERT P. GREENLEAF, OF CLEVELAND, OHIO; SAID GREENLEAF ASSIGNOR TO SAID BILLINGS.

LOADING APPARATUS.

1,286,168.  Specification of Letters Patent.  Patented Nov. 26, 1918.

Application filed July 9, 1917, Serial No. 179,301. Renewed February 21, 1918. Serial No. 218,592.

*To all whom it may concern:*

Be it known that we, FRANK BILLINGS and ROBERT P. GREENLEAF, citizens of the United States, and residents of Cleveland, in the county of Cuyahoga and State of Ohio, have invented a certain new and useful Improvement in Loading Apparatus, of which the following is a full, clear, and exact description.

This invention relates to loading machines adapted particularly for use in mines where the head room is limited, and is of the general type of loading machine constituting the subject matter of a companion application filed by us of even date herewith.

In the companion application referred to, we have disclosed a loading machine which includes a truck and a loading structure mounted thereon comprising a reciprocating ram carrying a material conveying element in the form of a shovel supported from the ram by swinging arms, the ram being mounted for reciprocating movement forwardly and rearwardly, and on its forward movement causing the shovel to be loaded with material, and the swinging arms being arranged so that when the ram is retracted the arms are swung upwardly carrying the shovel back over the machine so that the material can be dumped in a suitable receiving element at the rear thereof. In said companion application a single motor is provided for reciprocating the ram and for swinging the arms and the shovel, the latter together with the arms being swung upwardly and rearwardly while the ram is traveling rearwardly near the end of its rearward stroke, and the shovel and arms are swung forwardly and downwardly during a portion of the ram movement in the reverse direction. In order that the shovel may be swung back over the machine with a short radius of movement so that it will not extend above the machine a very great distance the shovel supporting arms are made telescopic, and provision is made for automatically shortening the arms as they swing upwardly and rearwardly.

The present machine is of the general type of that briefly referred to above, the particular object of the present invention being to provide means which for a given capacity and range of movement allow the machine as a whole to be shortened and the swinging arms to be shortened and permit the shovel and arms to be swung back over the machine within a given head room without requiring arms of the telescopic type.

The invention may be further briefly summarized as consisting in certain novel details of construction and combinations and arrangements of parts which will be described in the specification and set forth in the appended claims.

In the accompanying sheet of drawings, Figure 1 is a side view of the improved machine with the parts in the relative positions which they occupy at the beginning of the forward or filling stroke; Fig. 2 is a top plan view of the same; Fig. 3 is a view similar to Fig. 1 on a reduced scale, showing the ram extended and the parts in the relative positions which they occupy when the ram is fully extended, this view showing also by dotted lines, other positions of the ram, shovel, and of the shovel supporting arms; Fig. 4 is a front view of the machine; and Fig. 5 is a transverse sectional view substantially along the line 5—5 of Fig. 1.

The machine includes a wheeled truck 10 on which are mounted the working parts of the machine, these being in the form of a superstructure which can be turned about a vertical axis, the truck being in this case provided with arc-shaped tracks 11 and the superstructure with rollers 12 which engage the tracks and are guided thereon. The body of the superstructure is in this case formed by a long horizontal cylinder 13 of a fluid pressure motor which is about as long as the truck. This motor is adapted to reciprocate forwardly and rearwardly a ram composed of a front member 14 which is connected to the plunger 15 of the motor, and two side members 16 which extend rearwardly alongside the cylinder 13, this ram being therefore substantially U-shaped. The side members 16 of the ram are formed in this case of angles and plates including three angles 16ª, 16ᵇ and 16ᶜ with inwardly turned flanges, and connected together by one or more plates 16ᵈ. This ram and the parts supported thereby are supported and guided for forward and rearward reciprocating movement by rollers and tracks including two track bars 17, secured to opposite sides of the cylinder 13, these track bars being engaged by upper and lower rollers 18 carried by the rear end of the ram and adapted to engage the upper and lower faces of the bars, and they are further supported by forwardly disposed rollers 19 which are supported at the lower front portion of the cylinder 13 and are engaged by the flanges of the lower angles 16ª of the ram.

The ram is adapted to reciprocate, that is to say, move forwardly and rearwardly a material moving or loading element, here shown as a shovel 20, which is substantially triangular shaped and has an open front and a bottom plate which is the digging or scooping part. This shovel is supported from the ram by swinging arms 21 which are connected to opposite sides of the bucket and which during the filling stroke of the ram extend downwardly and forwardly from the latter and rest upon bumpers or stops 22 which are carried by brackets 23 secured to the front side portions of the ram. These brackets can be adjusted to vary the inclination of the arms during the filling stroke, and in order that the shovel may be properly positioned with respect to the arms regardless of their inclination during the filling stroke, the shovel may be adjusted relative to the arms. To accomplish this the arms are connected by pins or studs 20ª to the sides of the shovel so that the latter can be tilted or turned relative to the arms and can be fastened in any adjusted position by bolts 20ᵇ extending through arc-shaped slots 20ᶜ of the arms, as shown clearly in Fig. 1.

In the companion application previously referred to, these arms are swung, and at the same time they are given a rolling action by means of gear segments which when the ram is retracted to a certain point engage relatively stationary racks, all movements being imparted by one motor and taking place during the movement of the ram either rearwardly or forwardly.

In this case we obtain the same swinging and rolling movements, but the latter can be given to the shovel independently of the movement of the ram, and by separate motive means. It will be seen, particularly by reference to Fig. 1, that the arms are provided at their inner ends with gear segments 24 which engage, and are adapted to roll over racks 25 which are carried by, and are arranged along the sides of the ram in the planes of the gear segments. The rolling and swinging movements are imparted to the arms and shovel by a second motor, which as here shown, comprises a horizontal cylinder 26, which is above the main cylinder 13, and is considerably shorter than the latter. This cylinder 26 has at its opposite sides, laterally projecting flanges 27 which are secured to the upper rear portions of the ram, and it is provided with a forwardly extending plunger and cross head 29 (see Fig. 4) to which are connected L-shaped links or straps 30 having forward rollers 31 and rear rollers 32, traveling in long slots or guideways 33 of the ram, the shovel supporting arms 21 being attached to the rear ends of these links, preferably on the studs of the rear rollers 32, as shown in Fig. 1.

Thus it will be seen that when the plunger 28 of the upper motor is shifted, the links 30 are moved forwardly or rearwardly as the case may be, with the rollers traveling along the slot 33, and by reason of the engagement of the gear segments 24 with the racks 25, the shovel and the arms are simultaneously given a movement of rotation and a movement of translation, the arms and shovel swinging about the centers of the rollers 32, and at the same time the centers of these rollers travel in a straight line.

In operation, with the parts in the positions shown in Fig. 1, the ram is moved forwardly as far as desired, with the shovel in digging position, as shown, so as to fill the shovel. Then the ram is retracted and either just before or after this rearward movement is terminated, the ram of the upper motor is retracted, causing the shovel and the arm supporting it to be swung up over the machine and back to the rear thereof so that the contents of the shovel can be discharged into a dump car or other suitable receiving element at the rear of the machine. Then the shovel and shovel supporting arms are swung forwardly to the first position, after which the shovel is again filled and the operation is repeated.

With this mechanism the shovel can be swung from a point in front of the machine, back over the same, so as to discharge the material at the rear of the machine with relatively short radius arms, so that this machine can be operated successfully where the head room is limited as in a mine. This advantage is gained principally by reason of the fact that the shovel is given the rotary movement and a movement of translation with the center of rotation traveling rearwardly while the shovel is being moved to the dumping point.

It will be observed that if desired the shovel can be elevated immediately after being filled, so that as it is drawn rearward, material is not liable to fall from the same, and inasmuch as the swinging movements of the shovel and of its supporting arms are not dependent upon the movement of the ram and are not required to be given to the shovel and arms while the ram still has to pass through a portion of its movement, the machine can be shortened somewhat over that in the companion application, and the shovel will clear the forward end of the ram as it is being swung upwardly or downwardly with the relative short radius arms.

When the machine is being used in the manner above described, it will, of course, be braced or held against tipping or tilting forwardly when the ram is extended. This can be done by track anchors or clamps or by bracing the rear end of the machine against the overhead mine timbering.

It will be understood that strokes of variable speed and length can be given to the moving parts of the two fluid pressure motors which are preferably air motors by a suitable valve mechanism which is not here shown.

While we have shown simply a shovel for moving the material, other forms of material moving elements might under certain circumstances be employed to advantage, and therefore in the claims we employ the term "material moving element" or "material conveying element" for the shovel or equivalent member.

It will be observed that when the shovel loaded with material is swung to dumping position, the shovel supporting arms are actuated so as to lift the load as well as move it rearwardly, the lifting effect being dependent on the radius of the gear segments. The lifting and rearward moving actions can be varied to suit the exigencies of any particular case by varying the relation of the length of the shovel supporting arms and the radius of the gear segments.

While we have shown the preferred form of our invention, we do not wish to be confined to the precise details shown, but aim in our claims to cover all modifications which do not involve a departure from the spirit and scope of our invention.

Having described our invention, what we claim is:

1. In a loading machine, a truck, means carried by the truck for receiving material in front of the machine for conveying it rearwardly over the machine and depositing the same at the rear thereof, said means comprising a material moving element, a ram mounted for forward and rearward movement, swinging arms connecting said element to the ram said arms being rotatably supported by the ram and having a forward and rearward movement of translation relative thereto.

2. In a loading machine, a truck, means carried by the truck for receiving material in front of the machine for conveying it rearwardly over the machine and depositing the same at the rear thereof, said means comprising a material moving element, a ram mounted for forward and rearward movement, swinging arms connecting said element to the ram said arms being rotatably supported by the ram and having a forward and rearward movement relative thereto, a motor for reciprocating the ram, and a separate motor for operating said arms.

3. In a loading machine, a truck, a material conveying element, means for actuating said element so as to pick up material in front of the machine, carry the same rearwardly over the machine and deposit the same in the rear thereof, said means comprising a forwardly and rearwardly movable ram, arms connecting said element to the ram, and means for giving said arms a rolling movement independently of the movements of the ram whereby said arms and said element may be swung upwardly over the machine and simultaneously given a movement of translation.

4. In a loading machine, a truck, means for picking up material in front of the machine for swinging the same over the latter and depositing the material at the rear of the machine, said means comprising a material moving element, a ram mounted for forward and rearward movement relative to the truck, swinging arms connecting said element to the ram, racks carried by the ram, gears carried by said arms, and means for rolling said gears over the racks whereby the arms are given simultaneously a swinging movement over the machine and a forward or rearward movement of translation.

5. In a loading machine, a truck, a shovel, means for giving said shovel a forward and rearward movement and a swinging movement over the machine so that material may be deposited at the rear thereof, said means comprising a ram mounted on the truck for forward and rearward reciprocating movement, a swinging arm connecting the shovel to the ram, said ram having a guideway extending lengthwise thereof, and means for moving the arm along the guideway and for simultaneously swinging the same about a horizontal axis.

6. In a loading machine, a truck, a shovel, means for giving said shovel a forward and rearward movement and a swinging movement over the machine so that material may be deposited at the rear thereof, said means comprising a ram mounted on the truck for forward and rearward reciprocating movement, a swinging arm connecting the shovel to the ram, said ram having a guideway and means for moving the arm along the guideway and for simultaneously swinging the same about a horizontal axis, said means comprising motive means connected to the arm and a pair of gear members one carried by the ram and the other movable with the arm and adapted to roll over the first named.

7. In a loading machine, a truck, a shovel, means for giving said shovel a forward and rearward movement relative to the truck and a swinging movement over the machine so that material can be dumped at the rear thereof, said means comprising a ram mounted for forward and rearward reciprocating movement, motive means for actuating the same, a pair of guideways carried by the ram and extending longitudinally thereof, swinging arms connecting the shovel to the ram and having guide members engaging said guideways, and means for causing said arms to travel along the guideways and to swing about a horizontal axis.

8. In a loading machine, a truck, a shovel, means for causing material to be scooped up from in front of the machine carried over the machine and deposited at the rear theerof comprising a shovel, a ram mounted for reciprocating movement forwardly and rearwardly, said ram having longitudinally extending guideways, arms connecting the shovel to said ram and having guide members movable along said guideways, means operatively connected to said arms for shifting the same along the guideways and co-operating gears carried by the ram and by the arms for causing said arms to be swung about a horizontal axis simultaneously with their forward or rearward movement relative to the ram.

In testimony whereof, we hereunto affix our signatures.

FRANK BILLINGS.
ROBERT P. GREENLEAF.